United States Patent [19]

Mori et al.

[11] Patent Number: 4,635,292
[45] Date of Patent: Jan. 6, 1987

[54] IMAGE PROCESSOR

[75] Inventors: Toshiki Mori, Ibaraki; Haruyasu Yamada, Hirakata; Kenichi Hasegawa, Osaka; Kunitoshi Aono, Hirakata, all of Japan

[73] Assignee: Matsushita Electric Industrial Co., Ltd., Osaka, Japan

[21] Appl. No.: 682,321

[22] Filed: Dec. 17, 1984

[30] Foreign Application Priority Data

| Dec. 19, 1983 | [JP] | Japan | 58-239104 |
| Dec. 19, 1983 | [JP] | Japan | 58-239235 |
| Jun. 8, 1984 | [JP] | Japan | 59-118483 |
| Jun. 8, 1984 | [JP] | Japan | 59-118484 |
| Jun. 21, 1984 | [JP] | Japan | 59-127905 |

[51] Int. Cl.[4] .......... G06F 9/28; G06F 15/66; G06K 9/36
[52] U.S. Cl. .......... 382/41; 382/49; 364/715; 364/900
[58] Field of Search .......... 382/41, 49; 358/160; 364/715

[56] References Cited

U.S. PATENT DOCUMENTS 4,174,514 11/1979 Sternberg .......... 382/49
4,384,336 5/1983 Frankle et al. .......... 382/49
4,395,698 7/1983 Sternberg et al. .......... 382/41

Primary Examiner—Howard A. Birmiel
Attorney, Agent, or Firm—Stevens, Davis, Miller & Mosher

[57] ABSTRACT

This invention provides parallel partial image processing such as spatial convolution or non-linear neighbor arithmetic operation using an image processor which can easily be formed as a large-scale integrated circuit and can be used for various purposes. The image processor has an adder-subtractor, a multiplier, a reciprocal number memory in which the reciprocal of an address and the amount of shift are stored at each address, and a shift register. The processor therefore is capable of high-speed dividing operations by multiplying a multiplicant by the reciprocal of a multiplier and by shifting the result of the multiplication. Also, by switching the inputs to the adder-subtractor and to the multiplier rapidly under program control, it is possible to perform arbitrary addition, subtraction, multiplication and division on partial image data of m rows and n columns stored in a partial image memory of the image processor.

5 Claims, 8 Drawing Figures

FIG. 8

| DIVISOR (2) | DIVISOR (10) | 1 / DIVISOR | STORED DATA (2) | AMOUNT OF SHIFT (10) |
|---|---|---|---|---|
| 0 0 0 1 | 1 | 1.0 0 0 0 0 0 0 0 | 1 0 0 0 | 3 |
| 0 0 1 0 | 2 | 0.1 0 0 0 0 0 0 0 | 1 0 0 0 | 4 |
| 0 0 1 1 | 3 | 0.0 1 0 1 0 1 0 1 | 1 0 1 0 | 5 |
| 0 1 0 0 | 4 | 0.0 1 0 0 0 0 0 0 | 1 0 0 0 | 5 |
| 0 1 0 1 | 5 | 0.0 0 1 1 0 0 1 1 | 1 1 0 0 | 6 |
| 0 1 1 0 | 6 | 0.0 0 1 0 1 0 1 0 | 1 0 1 0 | 6 |
| 0 1 1 1 | 7 | 0.0 0 1 0 0 1 0 0 | 1 0 0 1 | 6 |
| 1 0 0 0 | 8 | 0.0 0 1 0 0 0 0 0 | 1 0 0 0 | 6 |
| 1 0 0 1 | 9 | 0.0 0 0 1 1 1 0 0 | 1 1 1 0 | 7 |
| 1 0 1 0 | 10 | 0.0 0 0 1 1 0 0 1 | 1 1 0 0 | 7 |
| 1 1 1 1 | 11 | 0.0 0 0 1 0 1 1 1 | 1 0 1 1 | 7 |
| 1 1 0 0 | 12 | 0.0 0 0 1 0 1 0 1 | 1 0 1 0 | 7 |
| 1 1 0 1 | 13 | 0.0 0 0 1 0 0 1 1 | 1 0 0 1 | 7 |
| 1 1 1 0 | 14 | 0.0 0 0 1 0 0 1 0 | 1 0 0 1 | 7 |
| 1 1 1 1 | 15 | 0.0 0 0 1 0 0 0 1 | 1 0 0 0 | 7 |

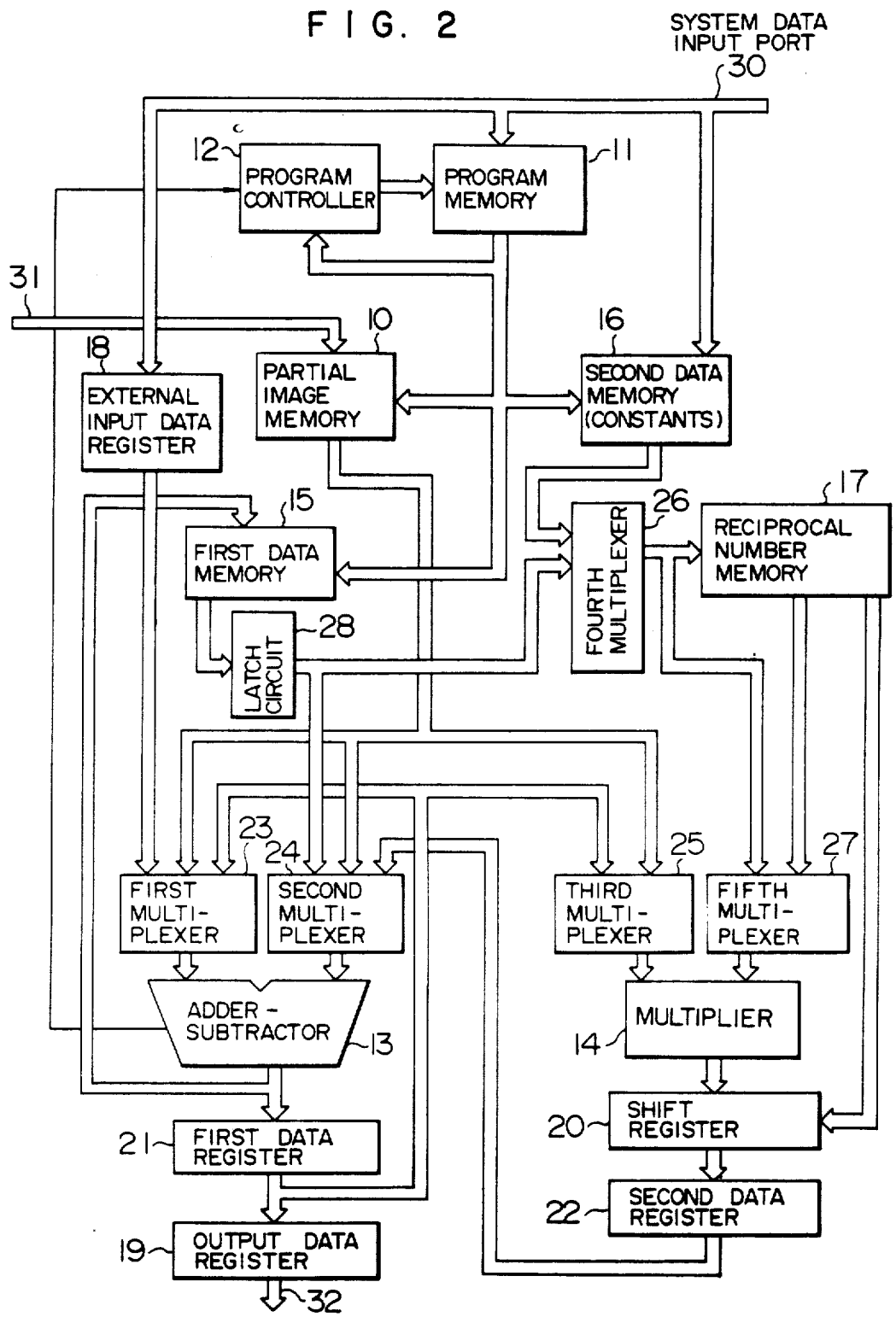

IMAGE PROCESSOR

BACKGROUND OF THE INVENTION

This invention relates to an image processor for performing parallel partial image processing such as spatial convolution or a non-linear neighbor arithmetic operation.

In general, digital image processing requires the processing of two-dimensionally arranged image data which is one of the difficulties of current Von Neumann type computers. Image processing requires great time for arithmetic operations and a large storage capacity. Thus, processing of image data at high speed by parallel processing has been attempted, but it was very difficult to process all image data in parallel. One technique in which partial images of m rows×n columns are processed in parallel is widely used. In such partial neighbor arithmetic operations, many functions such as averaging, differential operation or feature extraction can be realized. Thus, parallel partial image processing has been tried using hardware, but almost no large-scale integrated hardware is realized yet. Moreover, since the hardware for image processing is required to have a high-speed processing capability, spatial hardware is often used for each image processing, and thus it is desired to develop high-speed general-purpose hardware for image processing.

It is an object of the invention to provide an image processor which is suitable for high-speed processing of a general purpose and has architecture capable of large-scale integration.

SUMMARY OF THE INVENTION

According to this invention, there is provided an image processor for parallel partial image processing. The processor comprises a partial image memory to which m rows×n columns partial image data pieces are supplied in parallel, a program and memory for storing a program, a control circuit for controlling the program memory to read. The processor also includes an adder-subtractor, a multiplier, a first data memory for storing the output of the adder-subtractor, and a second data memory in which constants are previously store. The processor further comprises a reciprocal number memory in which the reciprocals of addresses are stored at the respective addresses, a data register for storing external input data, and means for selecting two data outputs from the data outputs of the partial image memory, the first data memory, the adder-subtractor, the multiplier and the data register and for supplying the two selected outputs to the adder-subtractor. The processor also includes means for selecting one data output from the data outputs of the partial image memory and the adder-subtractor and for supplying the selected one data output to the multiplier as a multiplicand, and means for selecting one output data from the data outputs of the first and second data memories and supplying the selected one data output directly to the multiplier as a multiplier or supplying the selected one data output through the reciprocal number memory by which the selected one data output is converted to the reciprocal thereof, to the multiplier as a multiplier. The respective means are operative under the control of the program. Therefore, since arbitrary addition, subtraction, multiplication and division can be rapidly performed on the m rows×n columns partial image under the control of the program, the image processor of the invention is suitable for highspeed processing and general purpose.

BRIEF DESCRIPTION OF THE DRAWINGS

FIG. 2 is a block diagram of one embodiment of an image processor of the invention.

FIG. 8 is an explanatory diagram useful for explaining the contents of the reciprocal number memory.

DESCRIPTION OF THE PREFERRED EMBODIMENT

Figure 1:
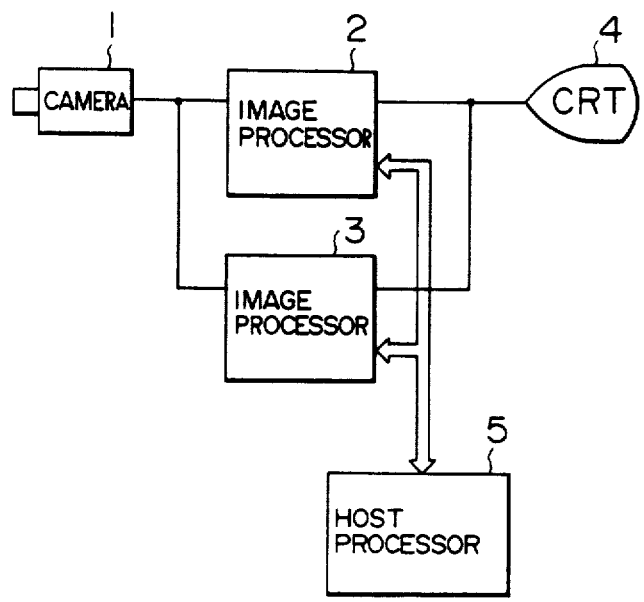
FIG. 1 is a block diagram of an image processing system using image processors of according to this invention.

FIG. 1 shows an example of an image processing system using an embodiment of an image processor of the invention. Referring to FIG. 1, there are shown two image processors 2 and 3 connected in parallel. The output of an ITV camera 1 used as an image input unit is supplied to the image processors 2 and 3, which perform parallel partial image data processing. The outputs of the image processors 2 and 3 are added and supplied to a CRT monitor 4. The image processors 2 and 3 are connected to a host processor 5 for controlling the whole image processing system. While in this example, two image processors are connected in parallel, one or a plurality of image processors may of course be connected in parallel.

FIG. 2 is a block diagram of one embodiment of an image processor of the invention. This embodiment of an image processor of the invention will hereinafter be described in detail with reference to FIG. 1.

This embodiment of an image processor of this invention includes a partial image memory 10, a program memory 11, a program controller 12, an adder-subtractor 13, a multiplier 14, a first data memory 15, a second data memory 16, a reciprocal number memory 17, an external input data register 18, an output data register 19, a shift register 20, a first data register 21, a second data register 22, a first multiplexer 23, a second multiplexer 24, a third multiplexer 25, a fourth multiplexer 26, a fifth multiplexer 27, and a latch circuit 28.

In the embodiment of FIG. 2, the program memory 11 previously stores an image processing program through a system data input port 30 under the control of the host processor 5 shown in FIG. 1 and so on. Also, the second data memory 16 similarly stores constants which are to be used upon execution of the image processing program. That is, before these image processors start to carry out image processing, the program and data are stored in the program memory 11 and second data memory 16. Upon image processing, the program controller 12 controls the contents of the program memory 11 to be read in turn, and the read program controls each block of the image processor to carry out image processing. The image processing program is completely executed once for a set of m×n partial images being stored in the partial image memory 10. Each time the partial image stored in the partial image memory 10 is updated, the program is repetitively executed so that the partial parallel image processing is made for the frame image data.

Each block in the embodiment of the image processor shown in FIG. 2 will be described in detail.

Figure 3:
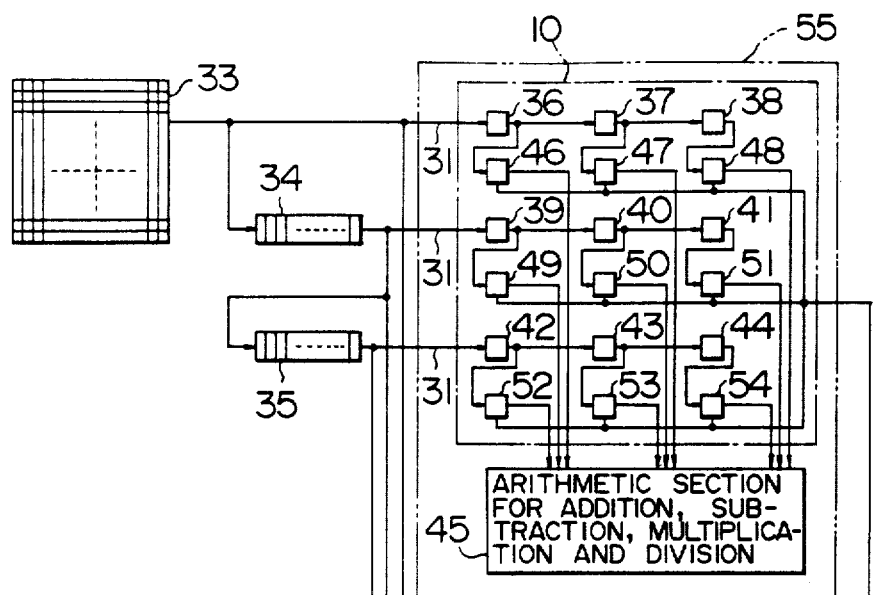

To the partial image memory 10 is supplied in parallel a set of partial image data of m rows×n columns through image data input ports 31 as shown in FIG. 3. The image data produced, by scanning in turn from the ITV camera 1 shown in FIG. 1, can be easily converted to partial image data of m rows×n columns generally by a shift register and so on. In FIG. 2, a set of partial image data is supplied in parallel through the image data input ports 31. The number of the input pins within this image processor can be naturally decreased by the conversion of the image data to partial image data when the processor is formed as a Large Scale Integrated circuit (LSI).

Thus, the input partial image data from the partial data memory 10 can be processed by simultaneous operation of the adder-subtractor 13 and multiplier 14 connected in parallel in this embodiment.

First, a description will be given of the data stream around the adder subtractor 13. To one input of the adder-subtractor 13 is supplied the output of one of the external input data register 18, the partial image memory 10, and the first data register 21, one of which is selected by the first multiplexer 23 under the control of the program read from the program memory 11. Also, to the other input of the adder-subtractor 13 is supplied the output of one of the first data memory 15 of which the output is supplied through the latch circuit 28, the partial image memory 10, the second data register 22 and zero, one of which is similarly selected by the second multiplexer 24. Thus, the adder-subtractor 13 is controlled by the program to add or subtract for input image data from the first and second multiplexers 23 and 24, and the output of the adder-subtractor 13 is stored in the first data register 21 and the first data memory 15.

To the external input data register 18 can be supplied arbitrary data through the system data input port 30. The partial image memory 10 is supplied with part of the program read from the program memory 11 as an address, and as a result, produces an arbitrary part of m rows×n columns of partial image data. The first data memory 15 is similarly supplied with an address of the program and produces data, which is then latched by the latch circuit 28. This latch circuit 28 enables a reading operation within one program step and a writing operation in a time sharing manner. Here, a two-port memory can be of course used.

A description will next be provided of the data stream around the multiplier 14. To one input of the multiplier 14 is supplied, as a multiplicant, the output of one of the first data register 21 and the partial image memory 10, one of which is selected by the third multiplexer 25 under the control of the program. As to the multiplier, first, one of the outputs of the second data memory 16 and latch circuit 28 is selected by the fourth multiplexer 26 under the control of the program. The output of the fourth multiplexer 26 is supplied to the reciprocal number memory 17 as an address and also to the fifth multiplexer 27 together with the output of the reciprocal number memory 17. One of the inputs is selected as a multiplier by the fifth multiplexer 27 and supplied to the multiplier 14 under the control of the program. The two pieces of data supplied from the third and fifth multiplexers 25 and 27 are multiplied by each other in the multiplier 14, the output of which is then supplied through the shift register 20 to the second data register 22, where it is stored.

The second data memory 16 has constants stored therein as described above. Thus, when a part of the program is supplied to the memory 16 as an address, an arbitrary constant can be read from the memory. That is, the multiplexer 26 selects one of a constant within the second data memory and a variable produced during execution of the program stored in the first data memory. However, the data from the fourth multiplexer 26 are supplied directly to the fifth multiplexer 27 and also through the reciprocal number memory 17 to the multiplexer 27, where one of the two inputs is selected and sent to the multiplier 14. The reciprocal memory 17 has data of the reciprocal of the input address, stored at each address. In other words, when the data selected by the fourth multiplexer 26 are supplied to the reciprocal number memory 17, the reciprocal of the input data is supplied to the multiplier 14 as a multipler. That is, multiplication of data A by the reciprocal of data B means that data A is divided by data B, and thus both multiplication and division can be performed by using the multiplier 14. In general division operations, the time necessary for division is several to several tens of times longer than that for multiplication as is well known. In this embodiment, a high-speed dividing operation is possible without significantly increasing the system scale.

Also, the reciprocal number memory 17 has stored at each address not only the reciprocal of input data but also data to be used for controlling the amount of shifting in the shift register 20. Thus, since the scale of the output of the multiplier 14 can be controlled to be adjusted upon division, it is possible to divide without increasing the number of bits of reciprocal data and the number of bits in the multiplier and with less operating error.

As described above, by reading the contents of the program memory 11 by the program controller 12 in turn, it is possible to make arbitrary addition, subtraction, multiplication and division operations on the partial image data stored in the partial image memory 10 at a high speed. The program controller 12 is supplied with a flag signal from the adder-subtractor 13 and the program read from the program memory 11 and controls the program memory 11 to be read on the basis of the input data. Of course, the branch and other operations of the program can be treated by a well known technique.

When one set of partial image data have been completely processed by executing the image processing program written in the program memory 11 as described above, the calculated result stored in the first data register 21 is transferred to the output data register 19, which then produces its output on an output port 32. Thereafter, new partial image data are stored in the partial image memory 10 and the image processing program is again executed. The above mentioned process is thus repeated to perform partial parallel image processing for frame image data.

Thus, according to the embodiment of the image processor of the invention as described with reference to FIG. 2, arbitrary addition, subtraction, multiplication and division operations on the partial image data stored in the partial image memory 10 can be carried out at high speed by providing the adder-subtractor 13 and multiplier 14 in parallel, and the reciprocal data memory 17 capable of converting input data to the reciprocal of the input data. Moreover, by updating the contents of the program memory 11 and those of the second data memory 16, it is possible to realize versatile image processing.

Also, according to this invention, since one set of partial image data can be stored in parallel in the partial image memory 10, such parallel arrangement as mentioned with reference to FIG. 1 can easily be realized, and thus each partial image data produced in turn by scanning the frame image data can be processed by both the image processors connected in parallel. Consequently, a complex image processing which requires many program steps can be carried out in real time.

In addition, since the image processor according to this embodiment can be formed as a large-scale integrated circuit (LSI) thus avoiding problems of the scale of integration and the number of input/output pins and is program controlled, various kinds of image processing can be realized by the same hardware, and low manufacturing costs are achievable by mass production of the LSI image processor.

According to the embodiment, means for enabling high speed addition, subtraction, multiplication and division on partial image data and means for enabling the image processors to be easily operated in parallel are provided to achieve an excellent image processor capable of high speed, versatile operation under program control.

Each block of this invention will hereinafter be described in more detail.

First, the partial image memory 10 in FIG. 2 will be described. This partial image memory comprises shift registers for deriving partial image data of a proper size from the input image and buffer registers for storing the contents of the shift register at a certain timing. A plurality of image processors according to this invention are used, and partial image data produced by scanning are controlled to be stored in the buffer registers of a plurality of partial image memories included in the image processors. Therefore, the partial image data can be processed in parallel by a plurality of image processors and hence processed at high speed.

FIG. 3 shows an arrangement of an image processing system using a plurality of image processors. Referring to FIG. 3, there are shown an input image of one frame 33, shift registers 34 and 35 corresponding to the number of one-horizontal picture elements, one-bit shift registers 36 to 44, an arithmetic section 45 for addition, subtraction, multiplication and division, and buffer registers 46 to 54. These elements 36 to 54 constitute an image processor 55. Reference numerals 56 and 57 represent the same type of image processors as the processor 55. Also, element 58 is a write control circuit for the buffer registers 46 to 54 of each of the processors 55 to 57.

The picture element data derived from the input image 33 are rearranged into partial image data of about 3×3 by the shift registers 34 and 35 of one-horizontal picture elements and one-bit shift registers 36 to 44, and thus the shift registers 36 to 44 produce the corresponding outputs.

The shift registers 36 to 44 are respectively connected to the buffer registers 46 to 54, which are responsive to a write control signal from the write control circuit 58 to simultaneously receive data from the shift registers 36 to 44, in other words, partial image data, and keep it therein. The arithmetic section 45 is connected to the buffer registers 46 to 54 so as to process partial image data.

The image processors 55, 56 and 57 each including the elements 36 to 44 are connected in parallel. Thus, the one-bit shift registers of each of the processors 56 and 57 produce the same partial image data as do the one-bit shift registers 36 to 44 of the image processor 55. The write control circuit 58 supplies write control signals, which have different phases and a period corresponding to $\frac{1}{3}$ the scanning speed, to the buffer registers of the image processors 55, 56 and 57, respectively. Thus, the partial image data derived from the input image are written in the buffer registers of each of the image processors 55, 56 and 57, in turn.

Figure 4:
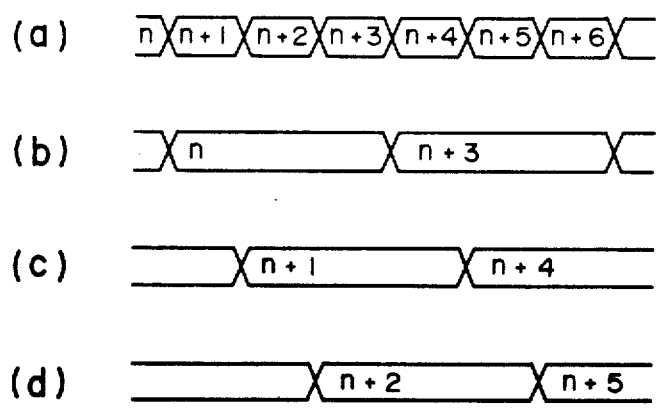
FIGS. 3 and 4 are respectively a block diagram of an image processing system using the partial image memory for m rows×n columns partial image and a timing chart of the operation.

FIG. 4 shows the timings at which the partial image data are written. FIG. 4(a) shows the partial image data produced from the one-bit shift registers of the image processors 55, 56 and 57, FIGS. 4(b), 4(c) and 4(d) respectively show the partial image data produced from the buffer registers of the image processors 55, 56 and 57.

Since partial image data are written in the buffer registers of each of the three image processors 55, 56 and 57, in turn, the image processors 55, 56 and 57 can process different partial image data in parallel. Therefore, the arithmetic section of each image processor may process one partial image data unit in three times the processing time required in the prior art. When each arithmetic section operates at the same speed as in the prior art, the frame image data can be completely processed in $\frac{1}{3}$ the processing time required in the prior art.

While three image processors are connected in parallel as shown in FIG. 3, the invention is not limited to three parallel processors but may use N image processors (N is an integer of two or above) by which data can be processed at N-times normal speed. Moreover, while the partial image data unit is 3×3 as shown in FIG. 3, the size of the partial image unit is not critical and of course one picture element may be formed of an arbitrary number of bits.

Thus, since a plurality of image processors of the invention are provided, and partial image data continuously derived from the input image are received and processed at different timings by the image processors, in turn, the image processing speed can be increased by a multiple of times corresponding to the number of the processors used. In addition, by the increase in the image processing speed, it is possible to process image data in real time, with the results that the image to be processed need not be stored in an image data memory and the system can have a simplified construction because a large-capacity image data memory is not required.

The first data memory 15 in FIG. 2 will be described below. This data memory 15 stores the calculated result from the adder-subtractor 13. The data memory 15 requires the function that read data is sent from an arbitrary address to the adder-subtractor 13 and that the calculated result is written at another address. In the prior art, such reading and writing operations are made at different addresses in one cycle by a two-port memory having two address inputs.

The data memory used in this invention is formed of a small number of memory cells and has the same function as in the prior art.

Figure 5:
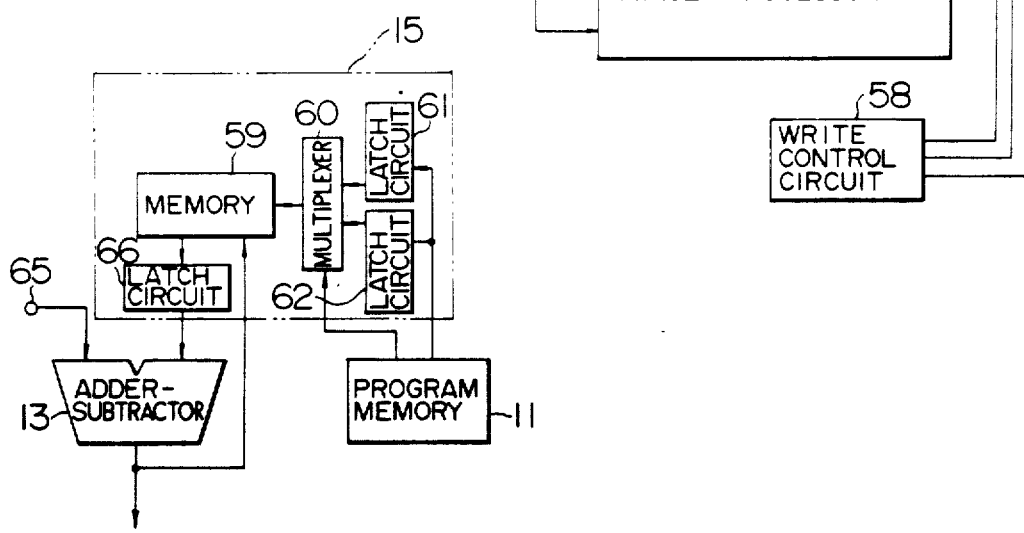
FIG. 5 is a block diagram of the first data memory.

This data memory is supplied with an instruction having a read address to this memory, a command unit for operation in the adder-subtractor and a write address to the memory. The data memory has a multiplexer and two latch circuits. Thus, the two addresses to the memory are respectively latched by the latch circuits and supplied through the multiplexer to the memory. FIG. 5 shows the data memory 15, adder-subtractor 13 and program memory 11. Referring to FIG. 5, there are shown a memory 59 for storing data, a multiplexer 60, and latch circuits 61 and 62. The read and write addresses of an instruction stored in the program memory 11 are latched in the latch circuits 61 and 62, respectively. In the first half period of the execution of the instruction, the read address is supplied from the latch circuit 61 through the multiplexer 60 to the memory 59. The data read from the memory 59 are supplied through a latch circuit 66 to the adder-subtractor 13 where it is added to or subtracted from the data supplied via an input end 65 to the adder-subtractor 13. The calculated result in the adder-subtractor 13 is fed back to the memory 59. In the second half period of the execution of the instruction, the write address is supplied from the latch circuit 62 through the multiplexer 60 to the memory 59, and thus the calculated result is stored at a predetermined address in the memory 59. The program memory 11 supplies the clock pulses that are being applied to this memory, to the multiplexer 60, thereby controlling its operation.

Since the first data memory 15 is constructed as mentioned above, the data-storing memory 59 need not be formed as a two-port memory, but may be a normal one-port memory. Therefore, the number of elements constituting the memory can be decreased, and thus this feature is suitable for very large-scale integrated circuits (V LSI).

The adder-subtractor 13 will be described below. The adder-subtractor 13 used in this invention has the feature that the absolute value can be calculated at high speed.

Figure 6:
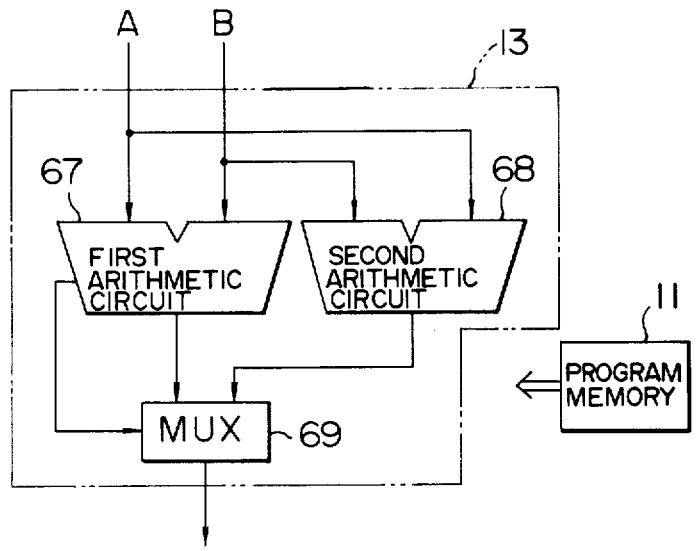
FIG. 6 is a block diagram of the adder-subtractor capable of high-speed calculation of absolute values.

This adder-subtractor 13 as shown in FIG. 6 comprises a first arithmetic unit capable of at least subtraction on the two input data pieces A and B, a second arithmetic unit capable of at least subtraction on the two input data pieces B and A (that is, the input data pieces are interchanged), and a multiplexer 69 which is controlled by the absolute-value calculate instruction and the sign bit in the output signal from the first arithmetic unit, to select either of the output signals from the first and second arithmetic unit.

The operation of the adder-subtractor 13 shown in FIG. 6 will be described. This adder-subtractor 13 includes the first and second arithmetic units 67 and 68 for calculating on the two inputs A and B and the multiplexer 69 for selecting one of the two input signals, and this adder-subtractor 13 is controlled by the program memory 11 having a program written therein.

The two input data pieces A and B are applied to the first and second arithmetic units 67 and 68. The first arithmetic unit 67 is capable of addition and subtraction, while the second arithmetic unit 68 may have at least the function of subtraction. When the absolute value of $A-B$, or $|A-B|$, is calculated, the instructions of "subtraction" and "absolute" written in one step in the program memory 11 are used. The first arithmetic unit 67 produces an output of $(A-B)$, and the second arithmetic unit 68 produces an output of $(B-A)$. The two outputs are supplied to the multiplexer 69. The multiplexer 69 normally selects the output of the first arithmetic unit 67, but only when the "absolute calculate" instruction is written in the program memory 11 and the sign bit in the output of the first arithmetic unit 67 is negative, the multiplexer 69 selects the output of the second arithmetic unit 68. Thus, by the instruction at one step it is possible to obtain the absolute value of the difference.

According to such arrangement of the adder-subtractor, since the calculated result can be obtained by the program step in a time as short as $\frac{1}{3}$ to $\frac{1}{4}$ the time required for the step in the prior art, the calculation can be made at high speed and the program memory may have a small capacity. In addition, since no conditional JUMP statement is required, it is possible to easily synchronize the input data with the output of the arithmetic unit.

Also, if the first and second arithmetic units are constructed to be of the same arrangement, the integrated circuit design can be easily made without any increase in the number of processes.

One object of this invention is to provide a processor suitable for recognition of letters, processing of images and so on.

The multipler-divider will be described below. The multiplier-divider used in this invention is simple in construction, and is capable of high-speed division.

In this multiplier-divider, division is made by multiplication of the dividend by the reciprocal of the divisor in a multiplier. That is, for division, the reciprocal of the divisor and the amount of shift corresponding thereto are previously stored in a memory, and the reciprocal and the amount of shift are read from the memory by using the divisor as an address. The reciprocal of the divisor is multiplied by the dividend in the multiplier, and the multiplied result is shifted in accordance with the amount of shift.

Figure 7:
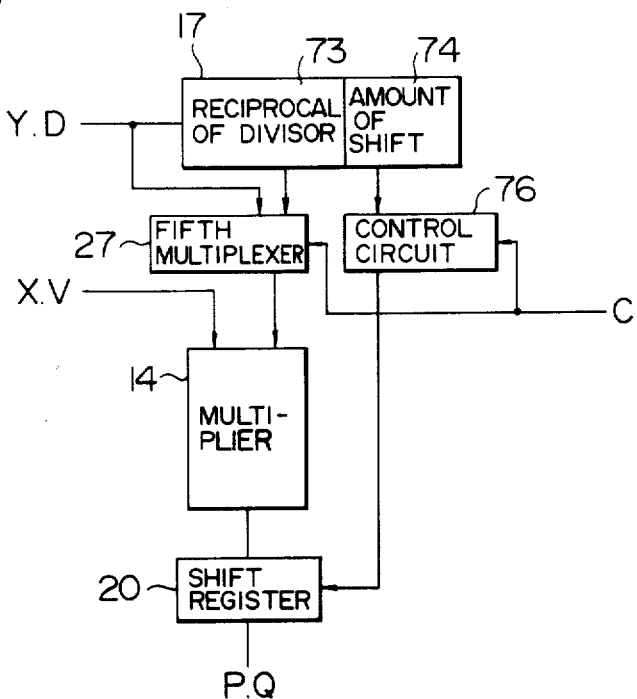
FIG. 7 is a block diagram of the high-speed multiplier-divider.

FIG. 7 shows an example of the multiplier-divider. The multiplier-divider, as shown in FIG. 7, comprises the multiplier 14, the reciprocal number memory 17 in which the reciprocal of the divisor is stored at 74 and the amount of shift is stored at 73, and the input multiplexer 27 for the multiplier 14. This multiplexer 27 is operated in response to a multiply/divide switching signal C, so as to select the multiplier Y for multiplication or the reciprocal of the divisor for division, read from the reciprocal number memory 17 by using divisor D as an address. Shown at 76 is a control circuit for the shift register 20. This control circuit 76 upon multiplication makes the amount of shift zero for multiplication and upon division supplies the amount of shift read from the reciprocal number memory 17 to the shift register 20.

When this multiplier-divider performs multiplication, the multiplier 14 is supplied with the multiplicand X and the multiplier Y from the multiplexer 27, and since the amount of shift in the shift register 20 is zero, the shift register 20 produces the output P, or the output of the multiplier 14 as a result of multiplication of X and Y. When the multiplicand X and multiplier Y are 4-bit binary data, the process for multiplication is as follows:

```
Multiplicand  X    1100. (12₍₁₀₎)
Multiplier    Y    0100. ( 4₍₁₀₎)
                  (×)
                  ─────────
                   0000
                   0000
                   0100
                   0000
                  (+)
                  ─────────
                   0010000. (48₍₁₀₎)
                   Amount of shift = 0
                   0010000. (48₍₁₀₎)
```

For division, the multiplier 14 is supplied with a dividend V and the reciprocal of a divisor D read from the reciprocal number memory 17 through the multiplier 27, and the shift register 20 is supplied with the amount of shift read from the reciprocal number memory 17 through the control circuit 76. As a result, the multiplied result from the multiplier 14 is shifted by the shift register 20 to produce the quotient, Q.

The reciprocal number memory 17 has the reciprocal of the devisor and the amount of shift as shown in FIG. 8. The divisor (2) and divisor (10) columns show the binary and decimal notation of the divisor D. The 1/divisor (2) column shows the binary notation of the reciprocal of the divisor D. The stored data (2) are stored in the reciprocal section 73 of the reciprocal memory 17 and correspond to the significant bits of the 1/divisor (2). While the stored data (2) have 4 significant bits as illustrated, the number of bits may be selected to match the necessary dividing precision. The amount-of-shift (10) column show values for correcting the shift caused when the stored data (2) is expressed by 4 significant bits. The amount-of-shift (10) is used for the shift register 20 to shift the output of the multiplier 14. When the dividend V and divisor D are each 4-bit binary data as in multiplication, the process for the division is as follows:

```
Dividend  V    1100. (12₍₁₀₎)
Divisor   D    0100. ( 4₍₁₀₎)
              (÷)
              ─────────
               1100.
               1000.
              (×)____Amount of shift
               0000
               0000
               0000
               1100
              (+)
              ─────────
               1100000.
               Shift 5 bits
               11.00000 (3₍₁₀₎)
```

In this way, the effective bits of the reciprocal of the divisor are multiplied by the dividend and the result is shifted by the corresponding amount, thereby achieving the division with high precision. The dividing speed in this system is determined substantially by the reading speed in the reciprocal number memory 17 and the multiplying speed in the multiplier 14 because the shifting operation can be performed at high speed. Here, the storage capacity, M of the reciprocal number memory 17, when the divisor D is 4 bits, is given as $M = 2^4 \times$ (bit count of the reciprocal + bit count of the amount of shift)

= 96 bits.

When the divisor D is 8 bits, the capacity M is 2816 bits. Thus, the memory may have such a small capacity, and the reciprocal and the amount of shift both expressed in bits can be read in parallel, so that the memory can be read at high speed. Therefore, the dividing speed greatly depends on the multiplying speed in the multiplier 14, and hence the multiplying operation and dividing operation can be performed at substantially the same speed.

The multiplier-divider comprises only the multiplier, the reciprocal number memory, the shift register and the multiplexer, and thus it has a simple construction and can perform dividing operations at high speed. In addition, if the stored data in the reciprocal number memory is of the same format as the multiplication in the multiplier, input signals of any format can be processed.

We claim:

1. In a partial image processor which divides image input data into partial image data pieces of m rows × n columns and processes said partial image data, an image processor comprising:
   a partial image memory to which said m × n partial image data pieces are supplied in parallel;
   a program memory for storing a program;
   a control circuit for controlling said program memory to read;
   an adder-subtractor;
   a multiplier;
   a first data memory for storing the output of said adder-subtractor;
   a second data memory for previously storing constants;
   a reciprocal number memory in which the reciprocals of addresses are stored at the respective addresses;
   means for selecting two data outputs from the image outputs of said partial data memory, said first data memory, said adder-subtractor and said multiplier and supplying said two pieces of data to said adder-subtractor;
   means for selecting one data output from the data outputs of said partial image memory and said adder-subtractor and supplying said one data output to said multiplier as a multiplicand; and
   means for selecting one output data from the data outputs of said first and second data memories and supplying said one output data directly to said multiplier as a multiplier or supplying said one output data through said reciprocal number memory, by which said one output data is converted to the reciprocal thereof, to said multiplier as a multiplier.

2. An image processor according to claim 1, wherein said partial image memory comprises shift registers for producing partial image data of m rows × n columns, and buffer registers for writing therein the contents of said shift registers at a predetermined timing.

3. An image processor according to claim 1, wherein said first data memory comprises a memory for storing data, two latch circuits for holding specified read and write addresses and a multiplexer for selecting a specified address to said data storing memory from the outputs of said two latch circuits.

4. An image processor according to claim 1, wherein said adder-subtractor comprises a first arithmetic unit having at least a function of an adding and subtracting operation on two inputs A and B, a second arithmetic unit having at least a function of a subtracting operation on inputs B and A resulting from interchanging of said inputs A and B, and a multiplexer which is controlled by an absolute value calculate instruction and a sign bit in the output of said first arithmetic unit to select one from the outputs of said first and second arithmetic units.

5. An image processor according to claim 1, wherein said multiplier-divider comprises a multiplier for performing multiplication on two numbers, a shift register for shifting the output of said multiplier, a reciprocal number memory for storing the reciprocal of an input signal and the corresponding amount of shift, means for making the amount of shift in said shift register upon multiplication, means for reading the reciprocal of the input signal and the corresponding amount of shift from said memory upon division, and means for shifting the result of the multiplication in accordance with said amount of shift.

* * * * *